(12) United States Patent
Washizawa (10) Patent No.: US 6,898,326 B2
(45) Date of Patent: *May 24, 2005

(54) IMAGE PROCESSING APPARATUS AND METHOD

(75) Inventor: Teruyoshi Washizawa, Atsugi (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 254 days.

(21) Appl. No.: 09/312,841

(22) Filed: May 17, 1999

(65) Prior Publication Data

US 2003/0053705 A1 Mar. 20, 2003

Related U.S. Application Data

(62) Division of application No. 08/623,536, filed on Mar. 29, 1996, now Pat. No. 5,917,943.

(30) Foreign Application Priority Data

Mar. 31, 1995 (JP) ............................................. 7-076510
Mar. 31, 1995 (JP) ............................................. 7-076515

(51) Int. Cl.[7] ............................. G06K 9/36; G06K 9/38; G06K 9/46

(52) U.S. Cl. ............... 382/253; 348/404.1; 375/240.03; 375/240.2; 375/240.22; 352/195; 352/247; 352/250; 352/277

(58) Field of Search ............................... 382/251, 253, 382/266, 277, 195, 247, 250; 375/240.02, 240.22, 240.03, 240.2; 348/404.1

(56) References Cited

U.S. PATENT DOCUMENTS 3,967,056 A   6/1976   Yata et al. .................. 348/356
5,067,158 A   11/1991  Arjmand ..................... 704/219

(Continued)

OTHER PUBLICATIONS

Traitement Du Signal, vol. 7, No. 2, Jan. 1990, pp. 101–115, P. Mathieu et al., "Image Coding Using Wavelet Transform and Vector Quantization".

(Continued)

Primary Examiner—Timothy M. Johnson
Assistant Examiner—Gregory Desire
(74) Attorney, Agent, or Firm—Fitzpatrick, Cella, Harper & Scinto (57) ABSTRACT

A transformation unit 102 transforms an entered image to multi-resolution space. A quantizer 105 performs vector quantization on a local pattern of an image of a multi-resolution representation. A perspective-order calculating unit 107 extracts a plurality of code words, positions corresponding thereto and/or angle of rotation and/or scale, and the perspective-order relationship of a plurality of these representative vectors, from the quantized image. An algebraic encoder 108 encodes the input image based upon the extracted information. As a result, there are provided an image processing apparatus and method for asymmetric encoding without motion in three dimensions and extraction of a three-dimensional structure. Further, a transformation unit 1103 transforms an entered image to vector field, and a singularity detector 1104 detects a singularity in the transformed image. A transformation encoder 1105 partitions the vector field into areas which include detected feature points, and each area is encoded by functional approximation. As a result, a finite number of feature points can be obtained with ease and an image processing apparatus and method exhibiting strong resistance to the effects of noise are provided.

10 Claims, 9 Drawing Sheets

U.S. PATENT DOCUMENTS

| | | | |
|---|---|---|---|
| 5,109,451 A | * 4/1992 | Aono et al. | 382/166 |
| 5,150,209 A | * 9/1992 | Baker et al. | 375/240.02 |
| 5,150,432 A | 9/1992 | Ueno et al. | 382/250 |
| 5,187,692 A | 2/1993 | Haneda et al. | 367/135 |
| 5,327,520 A | 7/1994 | Chen | 704/219 |
| 5,398,069 A | * 3/1995 | Huang et al. | 375/240.22 |
| 5,426,673 A | * 6/1995 | Mitra et al. | 375/241 |
| 5,473,555 A | 12/1995 | Potter | 364/724.1 |
| 5,535,300 A | * 7/1996 | Hall, II et al. | 704/227 |
| 5,577,135 A | * 11/1996 | Grajski et al. | 382/253 |
| 5,649,030 A | * 7/1997 | Normille et al. | 382/253 |
| 5,692,100 A | * 11/1997 | Tsuboka et al. | 704/222 |
| 5,696,850 A | 12/1997 | Parulski et al. | 382/261 |
| 5,696,851 A | * 12/1997 | Rao | 382/266 |
| 5,726,879 A | 3/1998 | Sato | 318/561 |
| 5,729,694 A | 3/1998 | Holzrichter et al. | |
| 5,905,579 A | * 5/1999 | Katayama et al. | 358/296 |
| 5,917,943 A | * 6/1999 | Washizawa | 382/190 |
| 6,072,910 A | * 6/2000 | Maeda et al. | 382/253 |

OTHER PUBLICATIONS

Signal Processing Image Communication, vol. 6, No. 6, Feb. 1, 1995, pp. 561–577, K.H. Yang et al., Wavelet Transform Coding for MCP Error Images Using Quadtree Decomposition and ECVQ.

IEEE Transactions on image Processing, vol. 4, No. 4, Apr. 1, 1995, pp. 478–485, O. Egger et al., "Subband Coding of Images using Asymmetrical Filter Banks".

Computer Vision Graphics and Image Processing, vol. 51, No. 3, Sep. 1990, pp. 275–298, F. Ulupinar et al., "Refining Edges Detected by a Log Operator".

IEEE Transactions On Information Theory, vol. 38, No. 2 PT. 02, Mar. 1992, pp. 617–643, S. Mallat et al., "Singularity Detection and Processing With Wavelets".

* cited by examiner

FIG. 9

IMAGE PROCESSING APPARATUS AND METHOD

This application is a division of application Ser. No. 08/623,536, filed Mar. 29, 1996 now U.S. Pat. No. 5,917,943.

BACKGROUND OF THE INVENTION

1. Field of the Invention

This invention relates to an image processing apparatus and method. More particularly, the invention relates to an image processing apparatus and method for high-efficiency encoding and recognition of images, as well as to an image processing apparatus and method for detecting the feature points of-an image.

2. Description of the Related Art

Many image encoding techniques have been developed on the basis of filtering theory, which is based upon analysis of frequency regions, and information-source encoding theory. Since the transformation process and inverse-transformation process of these theories have structures that are symmetrical to each other, the inverse transformation is self-evident and it is not required that one be aware of the inverse-transformation process. For this reason, the conventional encoding is referred to as "symmetric encoding".

Symmetric encoding will be described in brief. First, the performance demanded by symmetric encoding is as follows:

(1) Universality: It is required that various types of image information be encodable efficiently.

(2) Compatibility: It is required that compatibility between image media having different resolutions be assured. To this end, there is need of a scheme through which bit strings for various image media having different resolutions are obtained if part of an encoded bit string is extracted.

(3) Fidelity: It is required that a reproduced image be close to the original image. This involves establishing the concept of distance between images for the purpose of evaluating fidelity.

Rapid progress in symmetric encoding has been made in recent years, and sub-band encoding in particular has become the focus of much research for the following reasons:

(1) A practical image processing scheme having a high degree of compatibility and suited to the service layer of image communication is capable of being implement with ease.

(2) A visual spatial frequency characteristic modeled accurately in the sub-band region can be reflected directly in the control of encoding parameters.

Described next will be the research trends and technical level relating to transformation and quantization techniques, which are the requisite techniques of symmetric image encoding.

With regard to transformation techniques, studies regarding prediction and orthogonal transformation have for the most part been completed, and investigations now proceeding deal mainly with band separating/synthesizing filters for sub-band encoding. The three capabilities required of a band separating/synthesizing filer are as follows:

(1) Perfect reproducibility: In a case where an image is reproduced without performing encoding, it is required that the original signal be reproduced faithfully without causing distortion that accompanies folding.

(2) Linear topological characteristic: It is required that the filter have a linear or near linear topological characteristic in image encoding.

(3) Orthogonality: There should be no overlapping of filters for band separation.

At the present time, the only orthogonal filter of finite degree which truly satisfies the requirements of a linear topological characteristic and perfect reproducibility is the Haar filter (which is equivalent to a second-order quadrature mirror filter).

With regard to quantization techniques, an encoding characteristic that is near ideal has attained an implementable technical level. In high-rate quantization of an unstored information source, combining linear quantization and entropy encoding of a quantized output makes it possible to achieve quantization at a quantization loss of approximately 0.25 bit/sample in comparison with the rate-distortion limit. In case of quantization at a lower rate, an excellent quantization performance can be realized by combining scalar quantization, which is equipped with a dead zone, and entropy encoding of a quantized output, wherein the entropy encoding includes zero-run encoding. Furthermore, at a low rate, utilization of vector quantization also is possible. If use is made of lattice vector quantization or a multi-dimensional quantization method in which a code book is furnished with a certain algebraic structure, as in the manner of a permutation code, multi-dimensional, high-efficiency quantization closer to the rate-distortion limit can be realized over a wide range of from low to high rates.

However, if an image occupies a major portion of the information handled, encoding which relies solely upon geometric information of the information handled is insufficient. Accordingly, attempts to carry out compression utilizing the structure of an image, namely the structure of the actual world, have been studied from several standpoints. These new attempts have already shown that there is no assurance that the transformation process and inverse-transformation process will be symmetrical. With such encoding, therefore, it is required that sufficient consideration be given to the inverse-transformation process. Such encoding is referred to as "asymmetric encoding".

The foundation of the concept of a new type of image encoding (referred to as "asymmetric image encoding"), sometimes called "feature extraction encoding" or "structure extraction encoding" does not necessarily depend completely upon filtering theory alone, as is the case with conventional image encoding techniques. With asymmetric image encoding, symbolizing and reproduction algorithms are required to have the following properties:

(1) When an input image contains noise, it is required that fluctuation produced in a feature parameter by such noise be very small.

(2) A set of input images mapped onto identical feature parameters owing to the symbolizing algorithm should be as small as possible. If possible, the symbolizing algorithm should be one-to-one mapping to feature and structure parameters from the input image. The feature and structure parameter space and the symbolizing algorithm should be complete.

(3) The reproduction algorithm should be a stable, i.e., continuous mapping. More specifically, when noise due to coarse quantization appears in a feature parameter extracted by the symbolizing algorithm, and even when the calculation accuracy is unsatisfactory, it is required that reproduction of an image close to the original image be assured.

(4) It should be possible to calculate both the symbolizing algorithm and reproduction algorithm stably in numerical fashion and in a finite number of steps.

Asymmetric image encoding presently being studied can be classified as follows:

Application of IFS (Integrated Function Systems)

The self-similarity (fractal property) believed to exist between partial images of an input image is utilized to find a reduced mapping proper to each partial image, and encoding is attempted on the basis thereof. At the present time, an affine transformation is employed as the mapping. Since a reproduced image is given as a set of stable points in a dynamic system, the image is decoded by recursive processing.

Application of Edge Information

It has long been known that edges provide important information in terms of visual information processing. A complete description of an image can be achieved by combining edge information and appropriate additional information. In an image encoding/decoding system that employs edge information, the position of an edge is extracted from an input image by an encoder, a certain type of information (e.g., a differential coefficient) at this edge position is extracted and the image is reproduced by appropriate interpolation performed by a decoder.

Use of Motion Information

A method of estimating a motion vector as a feature parameter and performing encoding using this vector was been studied in the field of moving-picture encoding. More specifically, a moving vector is predicted, three-dimensional motion and a three-dimensional structure (rule) are predicted on the basis of the predicted vector, and on the basis of these a three-dimensional structural (rule) model is constructed. The image is encoded/decoded using this three-dimensional structural (rule) model.

At the present time, it is assumed that when IFS is applied in image encoding, the fractal property appears to the same degree over the entirety of one image. However, if a natural image is taken as an example, a plurality of objects will be present in one image. Therefore, the assumption that there is a fractal property over the entirety of the natural image can only mean that the above method is fairly careless. Further, the employment of edge information or motion information involves many unsolved technical problems in terms of pattern recognition, learning of knowledge, etc.

As mentioned above, an edge is widely accepted as the feature of an image. Here an edge refers to a portion of the image where there is a large amount of change in image intensity (luminance, density, saturation and hue). Edge position is detected as the position of the maximal value of the first-order differential coefficient or as the position at which a second-order differential coefficient becomes zero. (See F. Ulupinar and G. Medioni: "Refining edges detected by a LOG operator", Computer vision, graphic and image processing, vol. 51, pp. 275–298, 1990.)

A method of detecting a singularity by multi-resolution analysis has been proposed. (See S. Mallat and W. L. Hwang: "Singularity detection and processing with wavelets", IEEE Trans. information theory, vol. 38, no. 2, pp. 617–643, March 1992.) This method performs detection based upon the fact that a singularity exhibits a maximal value over all frequency components.

However, since a first-order differential coefficient has the effect of emphasizing noise, a method of detecting an edge from a first-order differential coefficient is susceptible to noise. Similarly, a method of detecting an edge from the zero-cross point of a second-order differential coefficient also is disadvantageous in that the precision of the position of the detected edge is influenced strongly by noise. Further, a method of detecting an edge by multi-resolution analysis is highly resistant to the effects of noise but involves a large amount of calculation.

Furthermore, an edge detected by these methods generally is continuous. If it is attempted to encode the original image based upon such an edge, it becomes necessary to execute some kind of threshold-value processing in order to select a finite number of feature points from a continuously existing edge.

SUMMARY OF THE INVENTION

An object of the present invention is to provide an image processing apparatus and method in which it is possible to execute asymmetric encoding that does not require the extraction of three-dimensional motion and three-dimensional structures.

According to the present invention, the foregoing object is attained by providing an image processing apparatus, comprising: transformation means for transforming data space of an input image to multi-resolution space and outputting a multi-resolution representation of the input image; detecting means for detecting a singularity in the input image; extracting means for extracting a local pattern, which is formed by a spatial arrangement of intensities of the multi-resolution representation in a partial area containing the detected singularity, with regard to partial areas of a plurality of sizes; quantizing means for creating a quantization code book based upon the extracted local pattern and replacing the multi-resolution representation by a code word using the code book; and encoding means for algebraic encoding code data which includes position coordinates of the singularity in the multi-resolution representation and the code word provided by the quantizing means.

Another object of the present invention is to provide an image processing apparatus and method in which image data are retrieved from a partial image by applying the aforementioned apparatus and method to image recognition.

According to the present invention, the foregoing object is attained by providing an apparatus further comprising memory means for storing degree of conformity or quantization error, calculated by the quantizing means, when the local pattern is allocated to a representative vector; and deciding means which, on the basis of the degree of conformity or quantization error, is for deciding the order relating to the perspective depth between any two representative vectors contained in the code data; wherein the encoding means encodes the order relating to the perspective depth.

A further object of the present invention is to provide an image processing apparatus and method strongly resistant to the effects of noise, in which a finite number of feature points can be readily obtained.

According to the present invention, the foregoing object is attained by providing an image processing apparatus comprising: input means for entering an image; transformation means for transforming data of the input image, which is represented by a function on a two-dimensional plane entered by the input means, to data of a vector field; detecting means for detecting a pole and a zero point of image data transformed by the transformation means; arithmetic means for calculating a finite number of expansion coefficients of a polynomial expansion about the pole detected by the detecting means; and deciding means which, based upon the position of each pole detected by the detecting means, is for deciding an area in which a polynomial expansion of finite degree obtained by the arithmetic means about each pole can be approximated.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Embodiments of an image processing apparatus according to the present invention will now be described in detail with reference to the drawings.

First Embodiment

Figure 1:
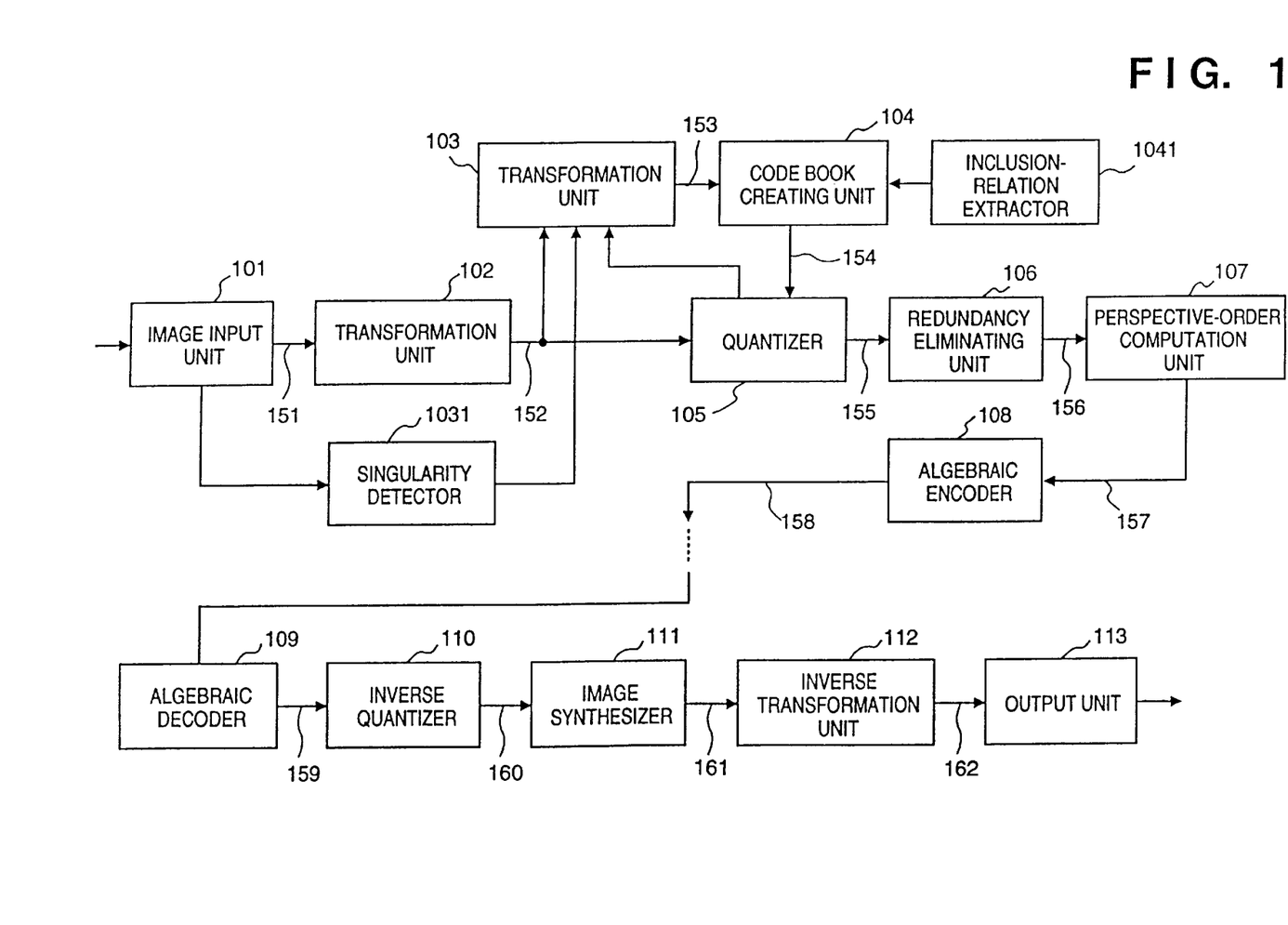
FIG. 1 is a block diagram illustrating the construction of an image processing apparatus according to an embodiment of the present invention.

FIG. 1 is a block diagram illustrating the construction of an image processing apparatus according to an embodiment of the present invention.

As shown in FIG. 1, the apparatus includes an image input unit 101, such as an image scanner, for reading the image of an original and producing an input image 151. The image input unit 101 is also capable of directly entering image data from an image processor or computer, not shown. The input image 151 is represented by Equation (1) shown below. Further, in a case where the input image is given as a digital image, it will suffice to convert this equation to discrete points.

$$f(x), x \in R^2 \quad (1)$$

A transformation unit 102 transforms the data space of the input image 151 to multi-resolution space. By way of example, multi-resolution space is four-dimensional space defined by a one-dimensional scale parameter s, a two-dimensional shift parameter b and a one-dimensional rotation-angle parameter θ. The input image 151 expressed in multi-resolution space is referred to as a multi-resolution representation 152. The transformation unit 102 performs a transformation in accordance with Equations (2), (3), shown below. In Equation (3), R(θ) represents a rotation matrix and $\phi_x$ a function referred to as an analyzing wavelet, which satisfies the condition of Equation (4) below. Further, an image f is reproduced in the manner of Equation (5) below.

$$\langle f, \phi_{s,b,\theta} \rangle = \int_{R^2} dx \overline{\phi}_{s,b,\theta}(x) f(x) \quad (2)$$

$$\phi_{s,b,\theta}(x) = s^{-1} \phi\left(R(\theta)^{-1}\left(\frac{x-b}{s}\right)\right) \quad (3)$$

$$C_\phi = (2\pi)^2 \int_0^\infty \frac{dr}{r} \int_0^{2\pi} d\theta \, |\phi(r\cos\theta, r\sin\theta)|^2 < \infty \quad (4)$$

$$f = C_\phi^{-1} \int_0^\infty \frac{ds}{s^3} \int_{R^2} db \int_0^{2\pi} d\theta \langle f, \phi_{s,b,\theta} \rangle \phi_{s,b,\theta} \quad (5)$$

Figure 2:
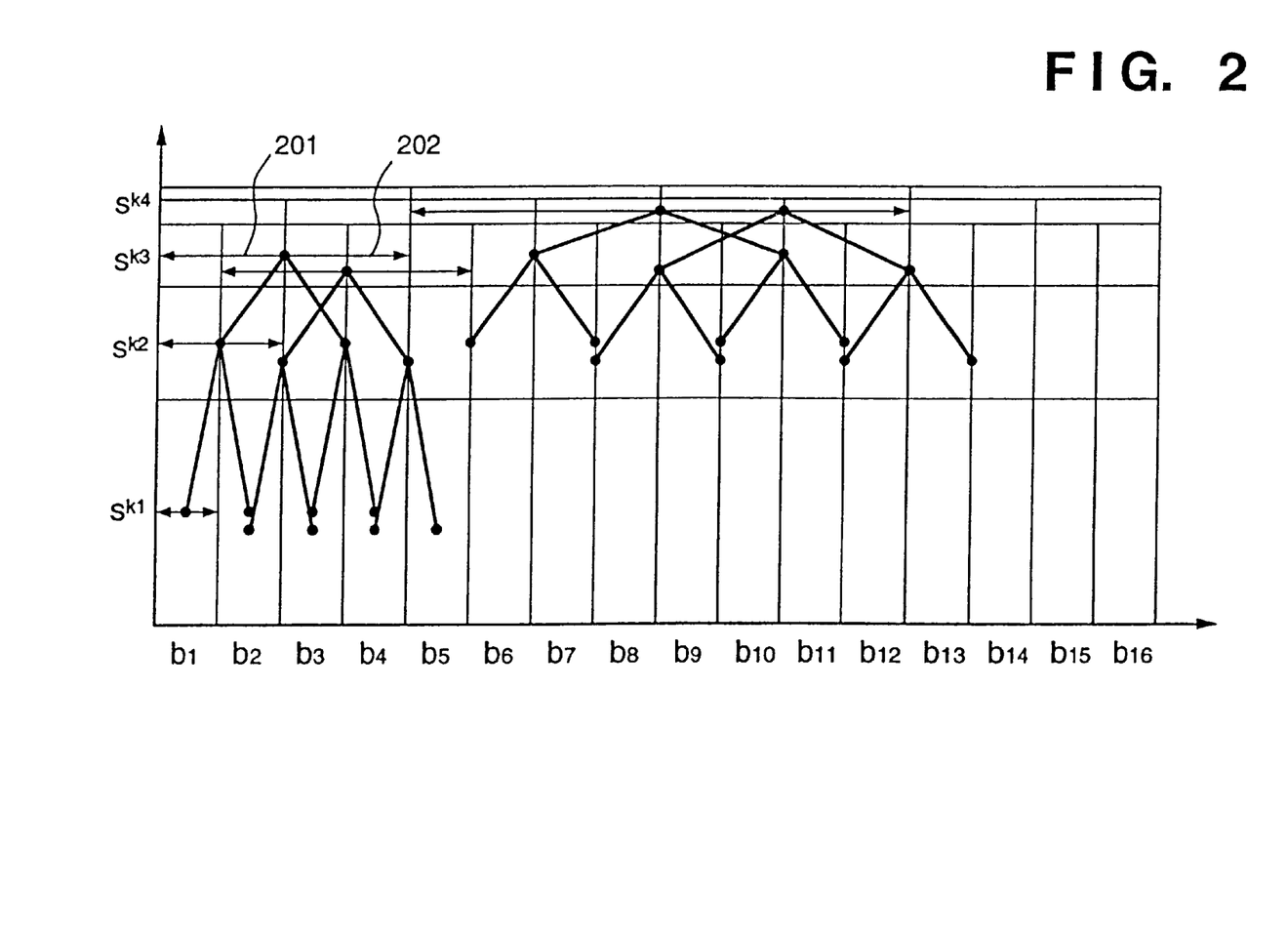
FIG. 2 is a diagram showing an example of a spatial sampling interval in a certain scale.

In actual calculation, a discrete multi-resolution space is convenient. In this case, each parameter is set in the manner indicated by Equation (6) below. In Equation (6), j represents the depth of a local pattern, defined later. This differs from the method of dealing with parameters used ordinarily in that a shift parameter in Equation (6) has a width $2^{Max(0,k-j)}$. As shown in FIG. 2, the spatial sampling interval (the offset between an interval indicated at 201 and an interval indicated at 202) at a certain scale is equal to a space width 203 of a wavelet base at a scale finer than the above-mentioned scale by an amount equivalent to the depth of the local pattern.

$$\left.\begin{array}{l} s = 2^k \\ b = (2^{Max(0,k-j)}\lambda\Delta x, 2^{Max(0,k-j)}m\Delta y) \\ \theta = n\theta_0 \end{array}\right\} \quad (6)$$

In order to avoid confusion, real space coordinates are adopted as two-dimensional coordinates in real space (the image), and coordinates in multi-resolution space are denoted by parameter coordinates. When those having rotational symmetry are employed as analyzing wavelets φx, the multi-resolution space becomes three-dimensional, with the axis relating to the angle of rotation having omitted. In this embodiment, analyzing wavelets having rotational symmetry are employed in order to facilitate an understanding of the following discussion. However, the discussion would be similar even if the angle of rotation were taken into account. In the diagram used for the purpose of explanation, real space is expressed by one dimension for the sake of simplicity. Transformation in case of a analyzing wavelets having rotational symmetry is performed as indicated by Equation (7) below.

$$\langle f, \phi_{s,b} \rangle = \int_x dx \overline{\phi}_{s,b} f_x, \; \phi_{s,b}(x) = s^{-1} \phi\left(\frac{x-b}{s}\right) \quad (7)$$

Figure 3:
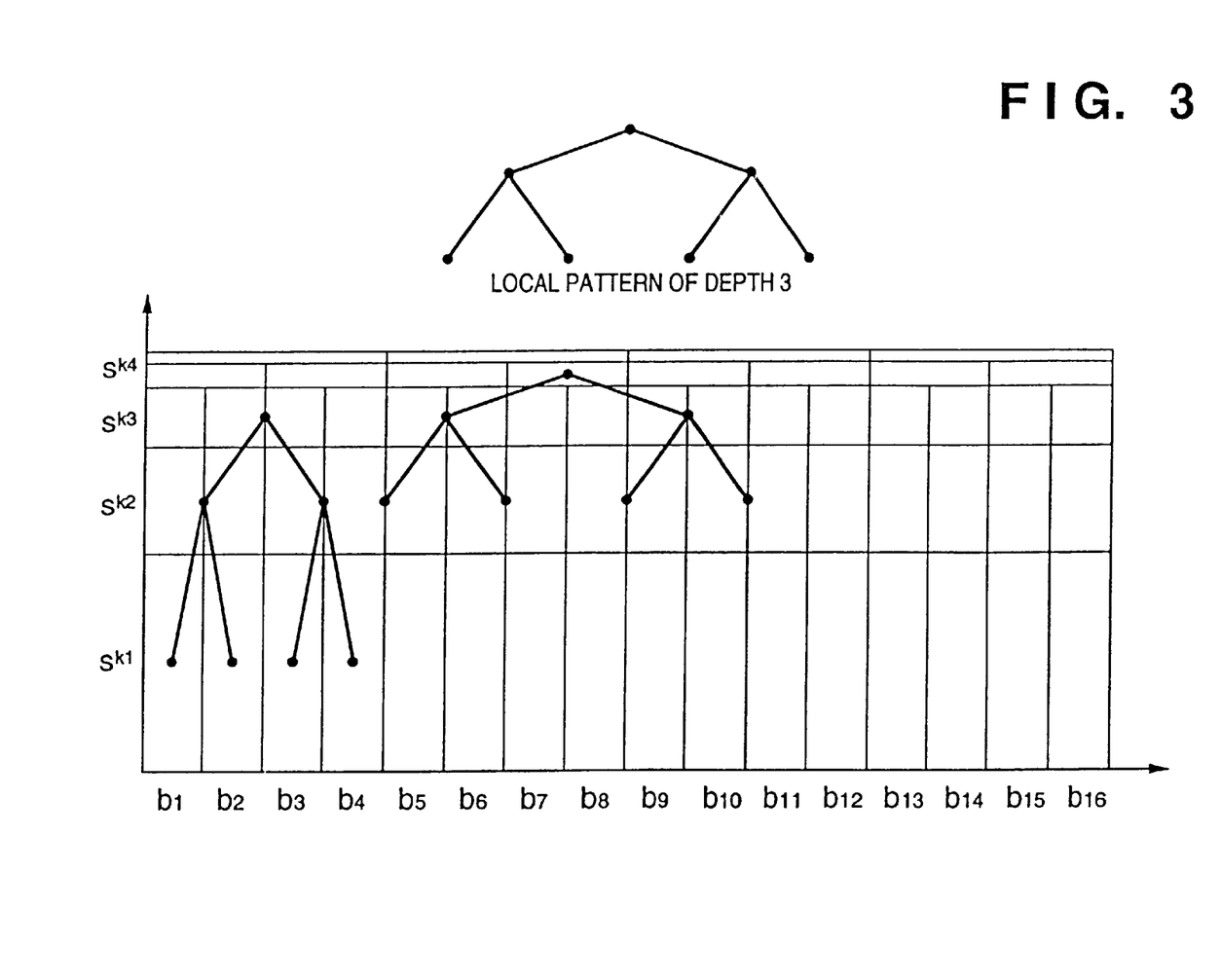
FIG. 3 is a diagram showing an example of a local pattern of depth λ=3.

A transformation unit 103 transforms the multi-resolution representation 152 to a representation of local pattern space and outputs a local pattern 153. The neighborhood $N_\lambda(s_1,b_1)$ with depth λ with respect to a parameter coordinate $(s_1=s^{k1}, b_1)$ is defined by Equations (8), (9) below. FIG. 3 is a diagram showing an example of a local pattern with depth λ=3. This shows that if the parameter coordinates differ, then the region covered by the local pattern, namely the real space region (the width b), and the scale region (which corresponds to the frequency region of width s) also differ.

$$s = 2^k, k = \{k_1, k_1 - 1, \ldots, Max(0, k_1 - \lambda)\} \quad (8)$$

$$b = b_1 \pm \left(\left(m - \frac{1}{2}\right)2^k \Delta x, \left(n - \frac{1}{2}\right)2^k \Delta y\right), m, n = \{1, \ldots, 2^{k_1-k}\} \quad (9)$$

Figure 4:
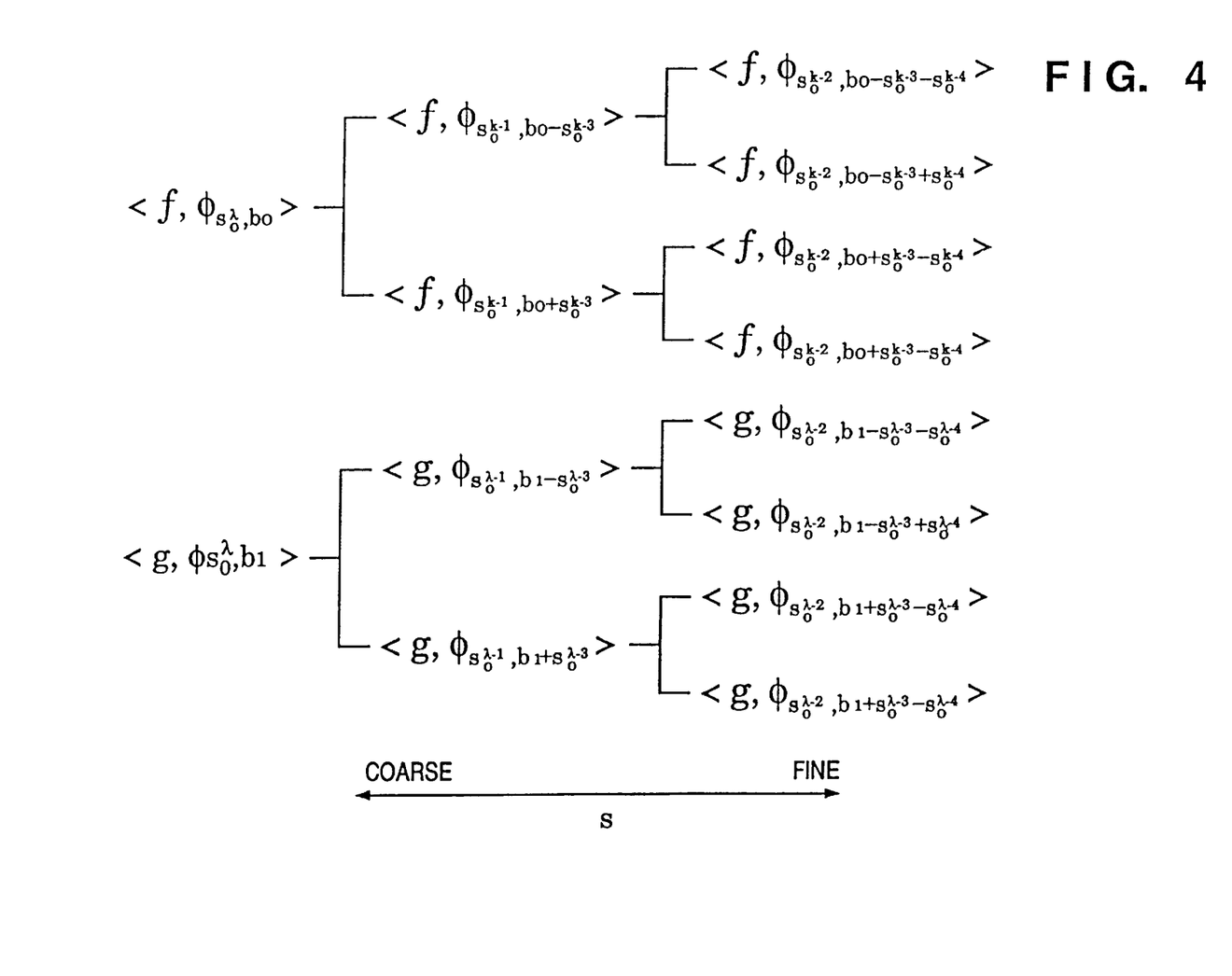
FIG. 4 is a diagram showing an example of a local pattern of depth λ.

Thus, the neighborhood $N_\lambda(s_1,b_1)$ with depth λ is equal to a quad tree (a binary tree in FIG. 3) including the node $(s_1,b_1)$ as the root. The local pattern of parameter coordinates (s,b) with depth λ is that obtained by making the value of the wavelet coefficient $<\phi_{sj,bk}>$ at the parameter coordinates correspond to each node of $N_\lambda(s,b)$. The local pattern space of depth $\lambda$ is referred to as function space established by defining an inner product, which is defined by Equation (10) below as the set of the quad tree mentioned above (see FIG. 4). The summation on the right-hand side of Equation (10) extends over nodes belonging to the local pattern. The local pattern space of depth $\lambda$ will be denoted by $T^\lambda$ and elements thereof will be denoted by $t_n^\lambda \epsilon T^\lambda$ hereinafter.

$$\left\langle \left\langle f, \phi_{s_0^k s_0^m, b_0+b} \right\rangle, \left\langle g, \phi_{s_0^\lambda s_0^m, b_1+b_{m,b}} \right\rangle \right\rangle = \quad (10)$$
$$\sum_{m,b} \left\langle f, \phi_{s_0^k s_0^m, b_0+b} \right\rangle \left\langle g, \phi_{s_0^\lambda s_0^m, b_1+b} \right\rangle$$

On the basis of information representing the parameter coordinates and depth sent from a quantizer 105, described later, the transformation unit 103 extracts the corresponding local patterns in discrete multi-resolution space and maps them in local pattern space of the respectively corresponding depths. Furthermore, the transformation unit 103 counts the frequency $p(t_n^\lambda)$ of appearance of each of the local patterns $t_n^\lambda$ and stores this value.

A singularity detector 1031 detects singularities of an image that has been entered by the image input unit 101. An edge detected by a Laplacian filter or Canny filter or a feature point of the image may serve as a singularity.

On the basis of the frequency $p(t_n^\lambda)$ of appearance of the local patterns mentioned above, the code book creating unit 104 registers a local pattern $t_n^\lambda$, at which the appearance frequency p has exceeded a suitable value (threshold value), in a code book as a representative vector, and establishes a relationship between the representative vector and a codeword. A jth representative vector with depth $\lambda$ will be denoted by $d_n^\lambda$ hereinafter. It should be noted that there can be a case in which the threshold value with respect to the occurrence frequency p is set for every depth $\lambda$ and a case in which the threshold value is set to be the same for all depths $\lambda$.

Figure 5:
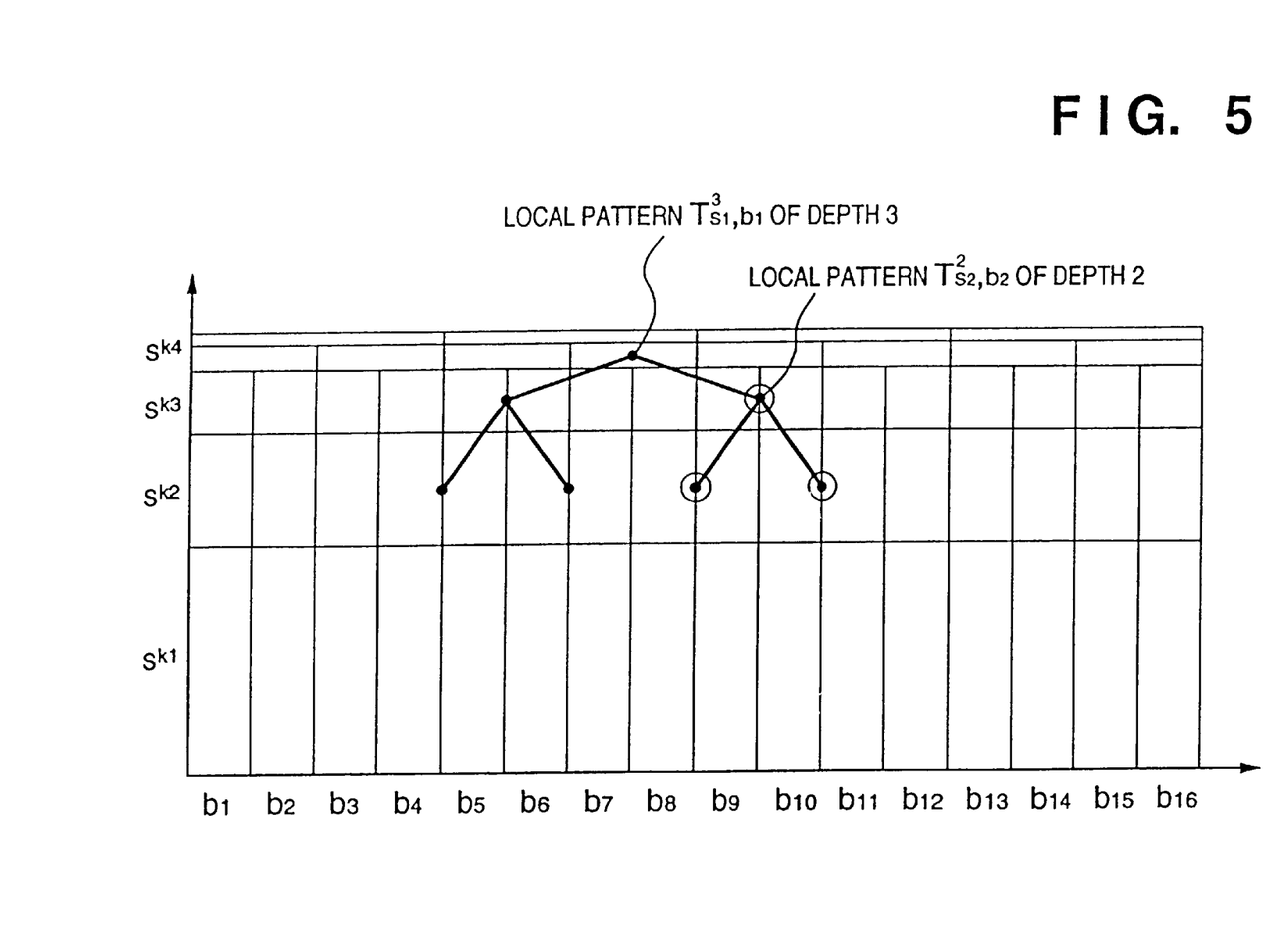
FIG. 5 is a diagram showing an example of a set-theoretic order relation which holds true between a local pattern with depth k and a local pattern with depth λ(>k)

A set of elements for which a set-theoretic order relation hold true exists between a local pattern with depth k and a local pattern with depth $\lambda(>k)$ (see FIG. 5. An inclusion-relation extractor 1041 connected to the code book creation unit 104 investigates the relation between local patterns having different depths. The order relationship referred to here is indicated by Equation (11) below. When trees coincide, this means that the values of wavelet coefficients at each node coincide. Though local patterns having different depths are correlated by such an order relation, the actual data contains an error. Therefore, representation as indicated by Equation (12) below using the inner product defined earlier is more realistic.

Among the partial trees $d_i^\lambda > d_j^k$, if and only if there is at least one subtree of $d_i^\lambda$ which coincides with $d_j^k$     (11)

$d_i^\lambda > d_j^k$, if and only if there is at least one subtree of $d_i^\lambda$ for which the inner product with $d_j^k$ is greater than a certain value     (12)

A quantizer 105 compares the multi-resolution representation 152 with a representative vector in a code book 154. The quantizer 105 performs the comparison with regard to local patterns of all depths for which representative vectors exist at each of the parameter coordinates in multi-resolution space, and the local patterns in the neighborhood of each of the parameter coordinates are replaced by code words corresponding to the representative vector $d_n^\lambda$ for which the above-mentioned inner product is maximized, thereby achieving encoding. In a case where the maximal value of the inner product does not become greater than a certain threshold value, the local pattern which is the object of comparison is adopted as the candidate for a representative vector and the parameter coordinates and depth thereof are outputted to the transformation unit 103. As a result of this processing, correspondence between appropriate code words and all parameter coordinates of multi-resolution space is obtained.

A redundancy eliminating unit 106 compresses an image 155 that has been encoded by the above-described local pattern. The data encoded using the representative vectors at each of the parameter coordinates are redundant in the sense of the order relation between representative vectors close to each other in real space (see FIG. 5). Accordingly, among the representative vectors supportive of which in real space share a common region, the redundancy eliminating unit 106 deletes unnecessary representative vectors using the set-theoretical order relation extracted by the inclusion-relation extractor 1041.

A perspective-order computation unit 107 extracts the perspective-order relationship with respect to real depth in the real space of real objects represented by representative vectors from a signal 156 outputted by the redundancy eliminating unit 106. There exists some pairs of representative vectors close to each other in the real space supportive of which in real space share a common region. Accordingly, these perspective-order relationships can be obtained depending upon which of two representative vectors in nearer than the other to the wavelet coefficients in the common region. This will be described with reference to FIG. 6.

In order to encode local patterns neighboring each of the parameter coordinates, the quantizer 105 calculates the inner product of the representative vectors. If a representative vector regarding an object situated at the most forward position in real space has been acquired and this object is not hidden by anything, the inner product between this representative vector and a local pattern corresponding to this object will coincide with the norm of the representative vector in a state in which there is no measured error. Local patterns 601 and 602 in FIG. 6 are local patterns corresponding to such an object (situated at the most forward position).

Figure 6:
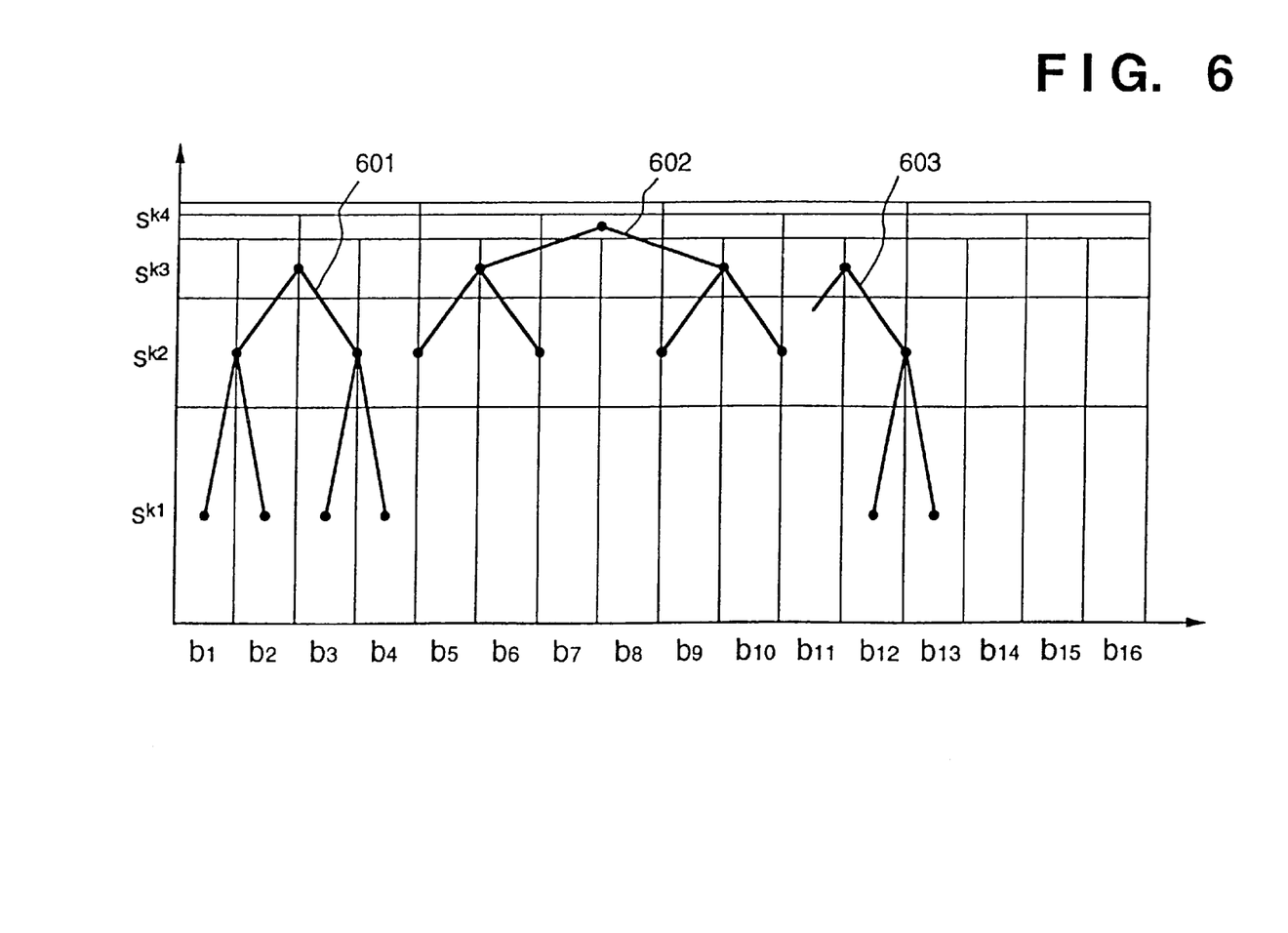
FIG. 6 is a diagram showing the manner in which a perspective order of representative vectors is extracted.

A local pattern 603 shown in FIG. 6 is a local pattern corresponding to an object hidden by another object. A common region shared by the support of the local pattern 603 and that of the other object (i.e., the local pattern 602) in real space is $b_{10}$ and $b_{11}$. In a region other than this shared region (namely a region extending from b11 to b 13), the inner product between the representative vectors corresponding thereto should coincide with the norm. In other words, in the shared regions b10 and b11, it can be predicted that the object 603 will be hidden by the object 602. Thus, by ascertaining the inner product between representative vectors at each of the parameter coordinates, the perspective-order relationship of the respective local pattern can be determined.

An algebraic encoder 108 algebraically encodes an output signal 157 from the perspective-order computation unit 107, namely a code word, real space coordinates, rotation and scale of a singularity and perspective-order information, and outputs a code 158. The outputted code 158 is stored in a memory (not shown) or transmitted via a line.

An algebraic decoder 109 algebraically decodes the code 158, which has entered from a memory or line. An inverse quantizer 110 generates local patterns from the code word contained in the algebraically decoded signal 159 and outputs the local patterns as a signal 160 indicative of the multi-resolution representation.

On the basis of the algebraically decoded real space coordinates, rotation, scale and perspective-order information, an image synthesizer 111 combines at least two local patterns, which have been generated by the inverse quantizer 110, into a single image. The signal 160 is expressed in multi-resolution space. An inverse transformation unit 112 inversely transforms the image (the multi-resolution representation), which has been synthesized by the image synthesizer 111, to a function in real space and outputs a signal 162 indicative of this function.

An image output unit 113 is a printer or display and forms or displays the image represented by the signal 162. The image output unit 113 stores the signal 162 on a recording medium or outputs the signal 162 to an image processor or computer, not shown.

An example has been described in which the transformation unit 102 transforms the input image 151 to multi-resolution space. However, it is also effective to transform the input image 151 to a multi-resolution pyramid. This method involves dividing the original image into several (e.g., four) partial images, obtaining the mean of the pixel values of each of the partial images, subdividing the partial images into several partial images and obtaining the mean of each image. By repeating this processing, a multi-resolution space approximation of the original image can be obtained.

Thus, in accordance with this embodiment, each input image can be expressed by a plurality of code words as well as the positions and sizes thereof or by the perspective-order relationship of the representative vectors. Further, though innumerable images can be generated by movement of a finite number of rigid bodies, this embodiment makes it possible to compactly express an image set of this type.

More specifically, this embodiment has the following effects:

(1) The perspective-order computation unit extracts information indicative of a plurality of code words, positions corresponding thereto and/or angle of rotation and/or scale, as well as information representing the perspective-order relationship of any two of these representative vectors, contained in the input image outputted by the quantizer. On the basis of the extracted information, the encoder encodes the input image. This makes it possible to achieve highly efficient encoding.

(2) The perspective-order computation unit compares the local patterns of one image with those of another one using the information extracted in (1) above. As a result, the comparison of the local patterns of any two images can be performed with ease.

(3) If (2) above is applied to an image recognition apparatus, retrieval of image data from partial images can be performed with ease.

(4) By combining the encoding apparatus described in (1) above and a decoding apparatus having the algebraic decoder 109, the inverse quantizer 110 which generates local patterns from a plurality of code words resulting from decoding and the image synthesizer 111 for synthesizing local patterns by positions, rotation angles and sizes corresponding to the generated local patterns and the information representing the perspective-order relationship of any two representative vectors, the amount of data transmitted, if image data are to be transmitted, is greatly reduced and the number of items of data (images) capable of being stored in a memory device can be increased.

Second Embodiment

Figure 7:
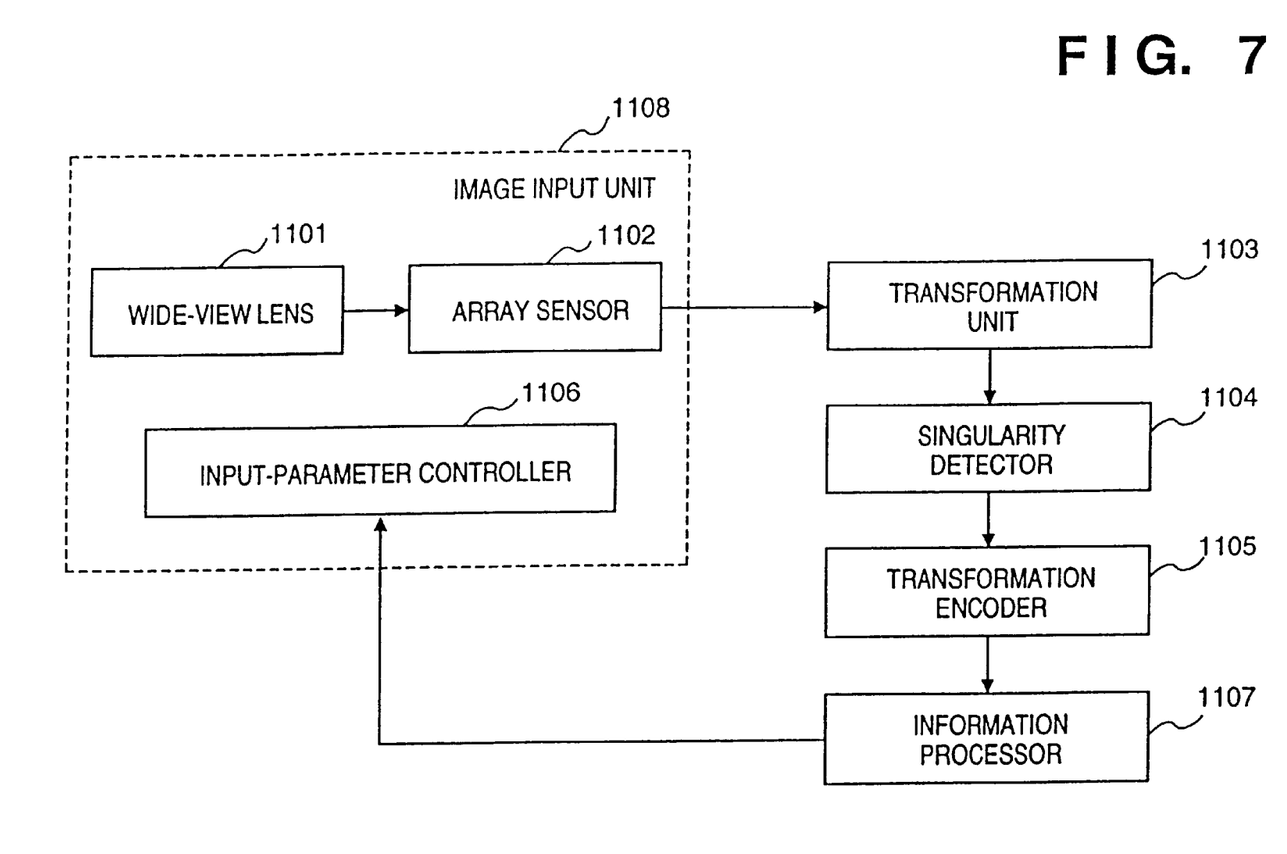
FIG. 7 is a block diagram illustrating the construction of an image processing apparatus according to a second embodiment of the present invention.

FIG. 7 is a block diagram illustrating the construction of an image processing apparatus according to a second embodiment of the present invention.

As shown in FIG. 7, the apparatus includes an image input unit 1108 having a wide-view lens 1101, an array sensor 1102 and an input-parameter controller 1106, the details of which will be described later. Light that has passed through the wide-angle lens 1101 impinges upon the array sensor 1102, which converts the light to an image signal and outputs the image signal.

A transformation unit 1103 applies processing, described later, to the image signal that has entered from the image input unit 1108. A singularity detector 1104 applies processing, described later, to a signal that has entered from the transformation unit 1103. A transformation encoder 1105 applies processing, described later, to a signal that has entered from the singularity detector 1104 and outputs a code to an information processor 1107.

[Wide-View Lens 1101]

Figure 8:
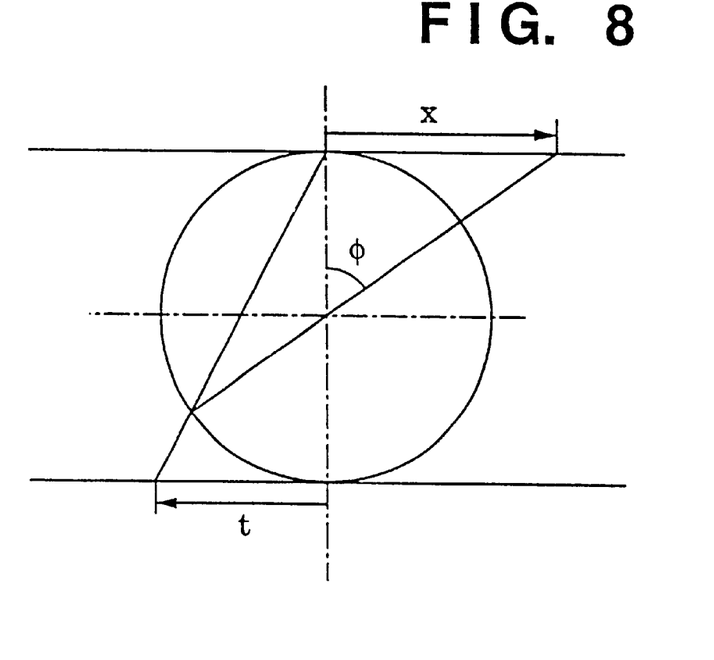
FIG. 8 is a diagram showing an example of a coordinate transformation by a wide-view lens illustrated in FIG. 7.

FIG. 8 is a diagram showing an example of a coordinate transformation performed by the wide-view lens 1101. In FIG. 8, x represents the radius of a polar coordinate system on an image plane situated on the front side of the input system, an t represents the radius of the polar coordinate system after a transformation performed by the wide-view lens 1101. Since this optical system is rotationally symmetric, the description given below will rendered solely with regard to the radial direction.

If we let $\phi$ represent the angle of incidence with respect to the optic axis and $\xi$ the focal length of a lens having the radius of the circle shown in FIG. 8, the radii t and x will be represented by the following equations, respectively:

$$t = 2\xi \tan(\phi/2) \tag{13}$$

$$x = \xi \tan(\phi) \tag{14}$$

On the basis of Equations (13), (14), the radius x can be expressed by the equation below as a function of the radius t. This is the coordinate transformation in the wide-view lens 1101.

$$x = \frac{t}{1 - \left(\frac{t}{2\xi}\right)^2} \tag{15}$$

The pattern (function) of frequency f(0), in the radial direction, which spreads over the entirety of the image plane is changed to the following function by the wide-view lens 1101:

$$f(t) = f(0) \frac{\left\{1 - \left(\frac{t}{2\xi}\right)^2\right\}^2}{1 + \left(\frac{t}{2\xi}\right)^2} \tag{16}$$

Of course, in a case where an arbitrary object present in three-dimensional space is adopted as the subject, it will suffice to know only the relationship between the incidence angle $\phi$ and the radius t. Accordingly, the coordinate transformation becomes as follows:

$$t = 2\xi \tan(\phi/2) \tag{17}$$

The coordinate transformation performed by the wide-view lens 1101 described above is a conformal map. Accordingly, singularities not present in the original image do not arise.

[Array Sensor 1102]

If we let $\phi_j(x)$ represent the integral kernel, the output $g_j$ of a jth (counting from the center of the optic axis) array sensor 1102 will be represented by the following:

$$g_j = \langle \phi_j(x(t;\xi)) | f(x(t;\xi)) \rangle \qquad (18)$$
$$= \int_{-\infty}^{+\infty} dt \overline{\phi}_j(x(t;\xi)) f(x(t;\xi))$$

[Transformation Unit 1103]

The transformation unit 1103 causes a gradient $\nabla$ to act upon an image $f(x,y)$ which is a function in two-dimensional space, thereby generating a vector field.

$$g(x,y) = \nabla f(x,y) \qquad (19)$$
$$= e1 \frac{\partial f}{\partial x} + e2 \frac{\partial f}{\partial y}$$

where e1,e2 are components of basis.
Further, $g(x,y)$ can be expressed as follows:

$$g(z) = r(z) \exp(\theta(z)) \qquad (20)$$

$$z = x + iy \qquad (21)$$

$$r(z) = \|\nabla f(x,y)\| = \sqrt{(df/dx)^2 + (df/dy)^2} \qquad (22)$$

$$\theta(z) = \arg(\nabla f(x,y)) = \arctan\left(\frac{df/dy}{df/dx}\right) \qquad (23)$$

Complex representation is used in the description given below.

[Singularity Detector 1104]

The singularity detector 1104 detects singularities by utilizing the argument principle. The argument principle will now be described. Let a function f(z) be a meromorphic in a simply-connected region D, and let C represent a simple closed curve having a positive direction within D. Assume that there is neither a zero point nor pole present on the closed curve C. In the interior of the closed curve C, assume that the function f(z) has a zero point of order $\lambda_k$ at each of $a_k$ (k=1, 2, ..., m) and a pole of order $\mu_k$ at each of $b_k$ (k=1, 2, ..., n). When starting from a point $Z_0$ on the closed curve C and returning to the point $Z_0$ upon making one full revolution of the closed curve, the amount of increase $\Delta c$ arg[f(z)] of the argument of the function f(z) is given by the following equation if we let $N_z$, $N_p$ represent the numbers of zero points and poles, respectively, within the closed curve C:

$$\Delta c \, \arg(f(z)) = 2\pi \{N_z(f) - N_p(f)\} \qquad (24)$$

A method of utilizing the argument principle to detect a feature point of a vector field $\{g_{m,n}\}_{m,n}$ quantized in space will now be described.

Step 1: Any point $z_{k,p} = \gamma_{k,p} \cdot \exp(\theta_{k,p})$ in a defined region of an image is selected.

Step 2: A circle C centered on $z_{k,p}$ and having a suitable radius $\rho$ is considered.

If this operation is performed, the following equation holds true with respect to a number $N_z(g) = \Sigma_{\lambda_k}$ of zero points and a number $N_p(z) = \Sigma \mu_k$ of poles, which reside within the circle C, of the complex function g(z) in consideration of their orders obtained by the vector-field constructing unit (transformation unit 1103) in accordance with the argument principle.

$$N_z(g) - N_p(g) = \frac{\Delta c \arg g(z)}{2\pi} \qquad (25)$$

Accordingly, by considering a circle having a radius of one pixel and centered on each pixel of a given image, the difference between the numbers of zero points and poles at all pixels is obtained using the above-described argument principle. At this time, the zero points or poles included in each circle are considered to be one at most. Therefore, a zero point is included when the right side of Equation (25) is positive and a pole is included when the right side of Equation (25) is negative. Accordingly, a center pixel when a pole is determined to be present is detected as the position of a singularity.

Figure 9:
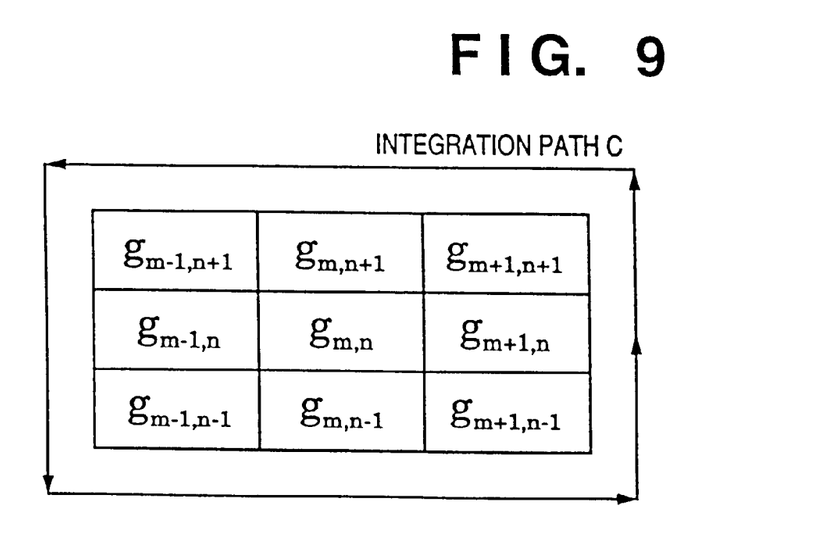
FIG. 9 is a diagram showing a path of integration performed by a singularity detector shown in FIG. 7.

Here $\Delta c \arg[g(z)]$ is calculated in the manner described below (see FIG. 9, which illustrates an integration path). The integration path may be a closed curve and is not limited the size shown in FIG. 9.

$$\Delta c \arg(g(z))|_{z=z_{m,n}} \cong \qquad (26)$$
$$\gamma(g(z_{m+1,n+1}), g(z_{m+1,n})) + \gamma(g(z_{m,n+1}), g(z_{m+1,n+1})) +$$
$$\gamma(g(z_{m-1,n+1}), g(z_{m,n+1})) + \gamma(g(z_{m-1,n}), g(z_{m-1,n+1})) +$$
$$\gamma(g(z_{m-1,n-1}), g(z_{m-1,n})) + \gamma(g(z_{m,n-1}), g(z_{m-1,n-1})) +$$
$$\gamma(g(z_{m+1,n-1}), g(z_{m,n-1})) + \gamma(g(z_{m+1,n}), g(z_{m+1,n-1}))$$

$$\gamma(x,y) = \begin{cases} \arg x - \arg y & \text{if } \arg x - \arg y \leq \pi \\ \arg y - \arg x & \text{otherwise} \end{cases} \qquad (27)$$

[Transformation Encoder 1105]

Figure 10:
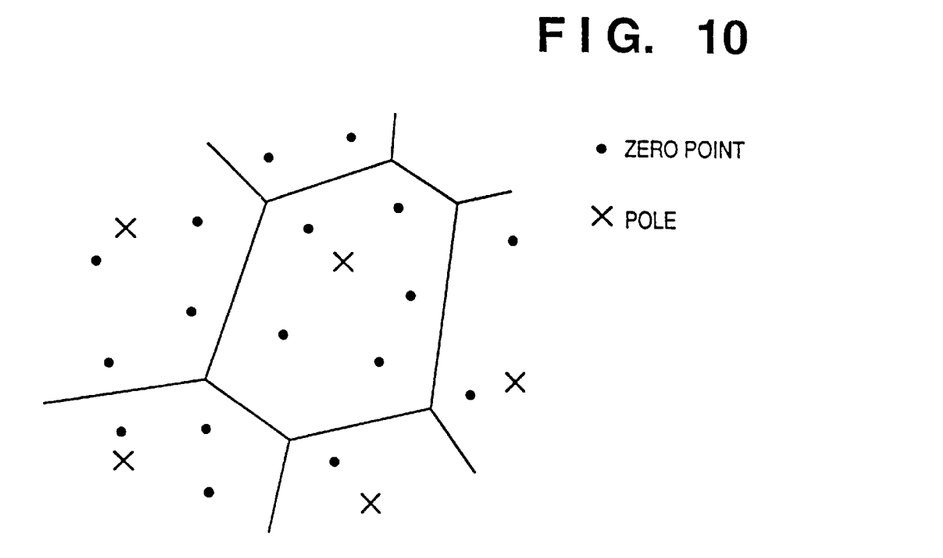
FIG. 10 is a diagram showing an example of division of an area by a transformation encoder illustrated in FIG. 7.

In order to divide the defined region of a vector field into a plurality of areas based upon the positions of poles, it will suffice to divide the defined region in such a manner that only one pole, for example, is included (see FIG. 10, which shows an example of dividing a region). If this expedient is adopted, convergence of the Laurent series around the pole is guaranteed in each region except the pole.

In order to functionally approximate the partitioned vector field around each pole in the range of the region corresponding thereto, if the positions of the poles and zero points within the partial area $D_j$ as well as the order are already known, the function w(z) can be expressed by Equations (28) through (30) below based upon the pole positions and orders $a_j, m_j$ (j=1, 2, ..., J) and the zero-point positions and orders $b_k, n_k$ (k=1, 2, ..., K). In a case where the zero point position and order cannot be specified, an orthogonal polynomial expansion can be employed. By using the Laurent series expansion around each pole to approximate each region, a reduction in error can be expected in a case where a large area is expressed by one function.

$$w(z) = \sum_j c_{-j}(z - a_j)^{-m_j} + \sum_k c_k(z - b_k)^{n_k} \qquad (28)$$

$$c_{-j} = \frac{1}{2\pi i} \oint_{\partial D_{-j}} d\eta \frac{w(\eta)}{(\eta - a_j)^{-j+1}} \qquad (29)$$

$$c_k = \frac{1}{2\pi i} \oint_{\partial D_k} d\eta \frac{w(\eta)}{(\eta - b_k)^{k+1}} \qquad (30)$$

[Input-Parameter Controller 1106]

The input-parameter controller 1106 controls the rotational angle of the optic axis of wide-view lens 1101 based upon control information of the rotational angle of the optic axis that has entered from the information processor 1107. The information processor 1106 calculates the amount of control of the rotational angle of the optic axis in such a manner that a singularity is taken on the optic axis.

Thus, by regarding visual information, which serves as a function on a two-dimensional plane, as one variable complex function, it is assured that the poles and zero points of the complex function will be isolated so long as the function is not a constant. In a case where the function is a constant, it will not contain any information and may therefore be ignored. Accordingly, in accordance with this embodiment, a finite number of singularities can be obtained naturally and with facility.

The apparatus is strongly resistant to noise. For example, impulse noise is detected as an edge in the method that relies upon both first-order and second-order differentiation. However, in the method of generating a vector field and detecting the singularity thereof, impulse noise is detected as a zero point. Accordingly, if a pole is employed as a singularity, as mentioned above, impulse noise has no effect whatsoever upon singularity detection. Adopting a pole and not a zero point as a singularity is appropriate from the viewpoint of function approximation. The reason for this is that the deciding factor of converging radius in case of series expansion is the position of a pole; a zero point plays no part whatsoever.

Thus, this embodiment can be suitably applied to image processing such as extraction of feature points and encoding/decoding of images.

Other Embodiment

The present invention can be applied to a system constituted by a plurality of devices (e.g., host computer, interface, reader, printer) or to an apparatus comprising a single device (e.g., copy machine, facsimile).

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus, comprising:
   a transformation section, arranged to transform data space of an input image to discrete multi-resolution space and outputting a discrete multi-resolution representation of the input image;
   a detector, arranged to detect a singularity in the input image;
   an extractor, arranged to extract a local pattern in the neighborhood of each singularity in the discrete multi-resolution representation of the input image, with regard to each of a plurality of depths;
   a code book creator, arranged to create a quantization code book by registering the extracted local pattern as a representative vector with a code word;
   a calculator, arranged to calculate an inner product of any two representative vectors in the code book;
   a remover, arranged to remove one of the two representative vectors it the inner product is larger than a predetermined value;
   a quantization section, arranged to replace each local pattern of respective depths of the discrete multi-resolution representation by a code word using the code book; and
   an encoder, arranged to algebraically encode data which includes position coordinates of the singularity in the input image and the code word provided by said quantization section.

2. The apparatus according to claim 1, further comprising a counter arranged to count frequency of occurrence of the local pattern, wherein said code book creator registers a local pattern in the code book when the frequency counted by said counter is higher than a threshold.

3. The apparatus according to claim 2, further comprising:
   a memory, arranged to store degree of conformity or quantization error, calculated by said quantization section when, the local pattern is allocated to a representative vector; and
   a decider, on the basis of the degree of conformity or quantization error, arranged to decide the order relating to the perspective depth between any two representative vectors contained in the code data,
   wherein said encoder encodes the order relating to the perspective depth.

4. An image processing apparatus comprising the image processing apparatus described in claim 3, wherein said image processing apparatus is applied to image recognition to retrieve image data from a partial image.

5. An image processing apparatus comprising:
   a decoder, arranged to decode a code generated by the image processing apparatus described in claim 3;
   an inverse quantization section, arranged to generate a local pattern from a code word contained in code data decoded by said decoder; and
   a synthesizer, arranged to combine a plurality of local patterns, which have been generated by said inverse quantization section, based upon position coordinates of a singularity decoded by said decoder, and order information relating to depth of a plurality of representative vectors.

6. The apparatus according to claim 5, further comprising a memory arranged to store code data and output the code data stored in said memory to said decoder.

7. An image processing method, comprising the steps of:
   transforming data space of an input image to discrete multi-resolution space and outputting a discrete multi-resolution representation of the input image;

detecting a singularity in the input image;

extracting a local pattern in the neighborhood of each singularity in the discrete multi-resolution representation of the input image, with regard to each of a plurality of depths;

creating a quantization code book by registering the extracted local pattern as a representative vector with a code word;

calculating an inner product of any two representative vectors in the code book;

removing one of the two representative vectors if the inner product is larger than a predetermined value; and replacing each local pattern of respective depths of the discrete multi-resolution representation by a code word using the code book; and algebraically encoding data which includes position coordinates of the singularity in the input image and the code word obtained in the replacing step.

8. The method according to claim 7, further comprising a step of counting frequency of occurrence of the local pattern, wherein the creating step registers a local pattern in the code book when the frequency counted in the counting step is higher than a threshold.

9. The method according to claim 8, further comprising the steps of:

calculating, in the creating step, degree of conformity or quantization error when the local pattern is allocated to a representative vector; and deciding the order relating to the perspective depth between any two representative vectors contained in the code data based on the degree of conformity or quantization error, wherein the encoding step encodes the order relating to the perspective depth.

10. The method according to claim 9, further comprising the steps of:

decoding a code encoded in the encoding step;

generating a local pattern from a code word contained in code data decoded in the decoding step; and combining a plurality of local patterns, which have been generated in the quantizing step, based upon position coordinates of a singularity decoded in the decoding step, and order information relating perspective depth of a plurality of representative vectors.

* * * * *